(12) United States Patent
Hoevener

(10) Patent No.: US 12,345,848 B2
(45) Date of Patent: Jul. 1, 2025

(54) INTERLOCK; SYSTEM, COMPRISING AN INTERLOCK; METHOD FOR CONTROLLING A FLOW OF PEOPLE AND/OR FOR SECURITY CHECKING; COMPUTER PROGRAM PRODUCT

(71) Applicant: dormakaba Deutschland GmbH, Ennepetal (DE)

(72) Inventor: Franz-Josef Hoevener, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 225 days.

(21) Appl. No.: 17/872,603

(22) Filed: Jul. 25, 2022

(65) Prior Publication Data

US 2023/0043595 A1 Feb. 9, 2023

(30) Foreign Application Priority Data

Aug. 6, 2021 (EP) .................................. 21190115

(51) Int. Cl.
*G01V 5/22* (2024.01)
*G07C 9/15* (2020.01)
*G07C 9/32* (2020.01)
*G07C 9/38* (2020.01)

(52) U.S. Cl.
CPC ............. *G01V 5/224* (2024.01); *G07C 9/15* (2020.01); *G07C 9/32* (2020.01); *G07C 9/38* (2020.01)

(58) Field of Classification Search
CPC .... G07C 9/15; G07C 9/03; G07C 9/28; B66B 1/46; G06Q 50/26
See application file for complete search history.

(56) References Cited

U.S. PATENT DOCUMENTS

| | | | |
|---|---|---|---|
| 4,847,485 A | 7/1989 | Koelsch | |
| 6,507,278 B1* | 1/2003 | Brunetti | B64F 1/366 340/541 |
| 7,190,256 B2 | 3/2007 | Pieper | |
| 2004/0188185 A1* | 9/2004 | Pieper | G07C 9/00 187/391 |
| 2008/0296501 A1* | 12/2008 | Breit | G01J 3/42 250/336.1 |
| 2017/0083768 A1 | 3/2017 | Xu et al. | |
| 2020/0320814 A1* | 10/2020 | Hastings | G01V 5/20 |
| 2021/0374426 A1* | 12/2021 | Park | G06V 40/172 |

FOREIGN PATENT DOCUMENTS

| | | |
|---|---|---|
| CN | 213659523 U | 7/2021 |
| DE | 3623792 C1 | 12/1987 |
| DE | 102006036108 A1 | 11/2007 |
| EP | 1430449 B1 | 7/2009 |
| JP | 2014006763 A | 1/2014 |

* cited by examiner

Primary Examiner — Mirza F Alam
(74) Attorney, Agent, or Firm — CANTOR COLBURN LLP

(57) ABSTRACT

An interlock includes an entrance and an exit as well as an inner region arranged between the entrance and the exit. The interlock has a body scanner and a separation sensor, wherein the separation sensor is configured to measure the number of people in the inner region of the interlock, and the body scanner is configured to scan a body of a person in the inner region of the interlock.

15 Claims, 1 Drawing Sheet

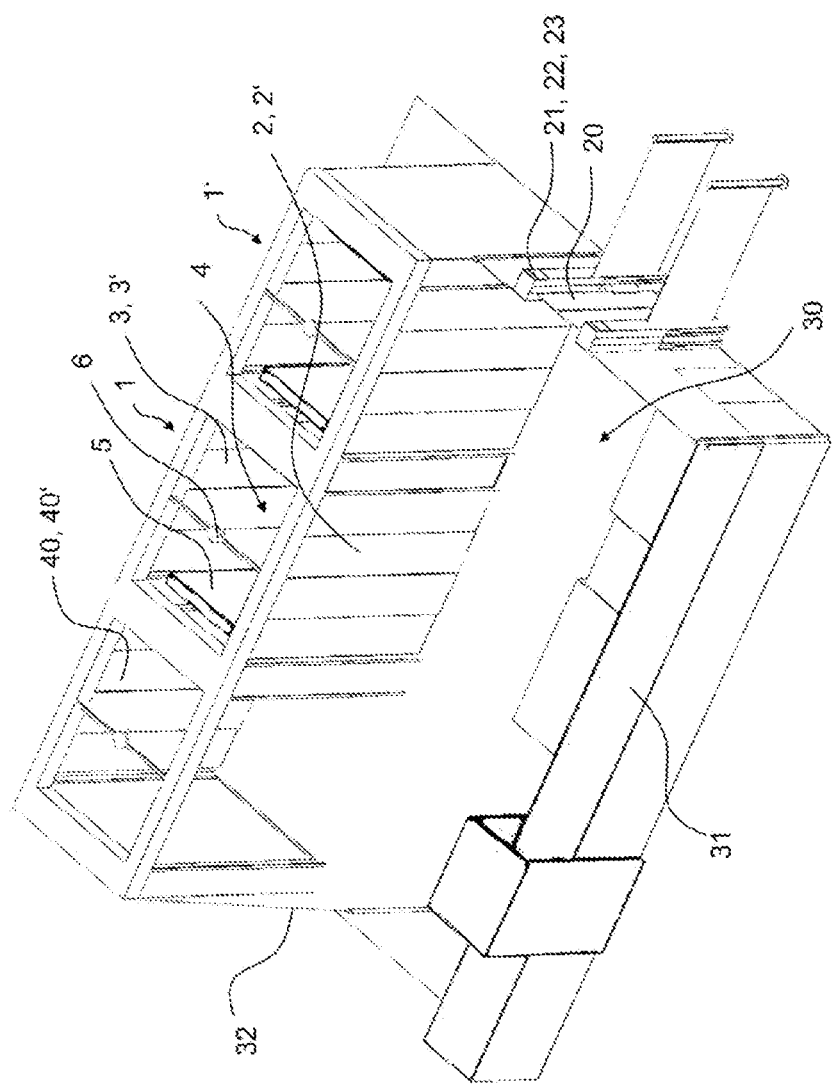

INTERLOCK; SYSTEM, COMPRISING AN INTERLOCK; METHOD FOR CONTROLLING A FLOW OF PEOPLE AND/OR FOR SECURITY CHECKING; COMPUTER PROGRAM PRODUCT

CROSS-REFERENCE TO RELATED APPLICATIONS

This application is related to and claims the benefit of European Patent Application No. 21190115.2, filed on Aug. 6, 2021, the contents of which are herein incorporated by reference in their entirety.

TECHNICAL FIELD

The disclosure relates to an interlock, wherein the interlock comprises an entrance and an exit as well as an inner region arranged between the entrance and the exit. Furthermore, the disclosure relates to a system, comprising such an interlock, to a method for controlling a flow of people and/or for security checking by means of an interlock as well as to a computer program product.

BACKGROUND

Such interlocks are used for example at airports or train stations or as an entry solution for a building or area. In order to increase the security of such facilities, security checks are carried out in which hazardous substances and/or weapons and/or objects that can be used as weapons are intended to be detected. In this context, processes to verify the identity of people, for example at airports, often also take place. The aim here is always to implement processes that are as secure as possible. The checks thereby often lead to delays and are a limiting factor for the overall process flow in such facilities. On the other hand, high personnel costs are typically necessary to carry out the checks and verifications with high reliability.

SUMMARY

Against this background, the disclosure provides an interlock, a system, a computer program product as well as a method, which enables a flow of people to be controlled and/or a security check to be carried out with high reliability, wherein time delays and/or effort can preferably be reduced.

The advantages are achieved by providing an interlock, wherein the interlock comprises an entrance and an exit as well as an inner region arranged between the entrance and the exit, wherein the interlock has a body scanner and a separation sensor, wherein the separation sensor is configured to measure the number of people in the inner region of the interlock, wherein the body scanner is configured to scan a body of a person in the inner region of the interlock.

According to the disclosure, a particularly advantageous interlock can therefore be provided, by means of which it is possible to efficiently detect weapons and/or objects that can be used as weapons and/or hazardous substances and at the same time determine the number of people in the interlock. This is possible without having to specifically position security personnel at the interlock for this purpose, who guide people individually into the interlock or monitor the number of people in the interlock. According to the disclosure, it can be ensured by means of the separation sensor in particular that the body scanner has scanned an individual person, such that a secure, automated security check can be achieved. As a result, delays at a security check can be avoided. Waiting times can hereby be reduced, wherein advantageous reliability can still be achieved.

The interlock is preferably formed as a security interlock, by means of which a flow of people can be controlled and/or a security check can be carried out. In particular, at least the exit of the interlock can be closed such that people cannot pass through the interlock unhindered. Furthermore, the entrance of the interlock can preferably be closed.

An entry solution is preferably formed by means of the interlock for an area and/or a building, in particular for an airport and/or a train station. The interlock makes it possible to control and/or monitor a flow of people in a closed region and/or a security region.

The separation sensor being configured to measure the number of people in the inner region of the interlock can, according to one embodiment of the present disclosure, be understood in that the separation sensor is configured such that it can at least be measured by means of the separation sensor whether the number of people in the inner region of the interlock is exactly one. Therefore, it can at least be determined by means of the separation sensor whether exactly one person is located in the inner region of the interlock. It can preferably also be determined by means of the separation sensor whether more than one person is located in the inner region of the interlock or whether fewer than one person is located in the inner region of the interlock. It is preferably conceivable that numbers of people in the inner region of the interlock greater than one can also be exactly determined by means of the separation sensor.

Advantageous further developments and configurations of the present disclosure can be inferred from the dependent claims.

According to one embodiment of the present disclosure, it is provided that the body scanner is configured to detect hazardous objects on the body of the person and/or on the clothing of the person. Hazardous objects can be understood here for example as weapons and/or as objects that can be used as weapons and/or other hazardous substances. The body scanner is preferably a full body scanner.

According to one embodiment of the present disclosure, it is provided that the body scanner is configured to scan the body of the person by means of X-ray and/or terahertz radiation. Concealed hazardous objects, for example under clothing, can also be effectively detected by means of such a body scanner.

According to one embodiment of the present disclosure, it is provided that the separation sensor and the body scanner are configured in such manner that a measurement can be carried out by the separation sensor and a scan can be carried out by the body scanner directly one after another or at least partially simultaneously. Electric switching means, in particular computer-implemented means, are preferably present, which actuate the separation sensor and the body scanner in such manner that a measurement can be carried out by the separation sensor and a scan can be carried out by the body scanner directly one after another, preferably without a pause in between, or partially simultaneously or fully simultaneously. Therefore, a particularly high level of security can be achieved. It is thereby particularly advantageously conceivable that the measurement by the separation sensor and the scan by the body scanner are carried out partially or fully simultaneously such that it is ensured that the number of people in the interlock is known during the scan with the body scanner. In this way, deception can be particularly advantageously prevented without security personnel having to be constantly posted at the interlock in order to monitor the number of people in the body scanner during the scanning. At least the exit of the interlock is preferably closed during the scanning by means of the body scanner and during the measuring by means of the separation sensor. It is preferably possible that during the scanning by means of the body scanner and during the measuring by means of the separation sensor, both the entrance and the exit of the interlock are closed.

According to one embodiment of the present disclosure, it is provided that the separation sensor is arranged in a ceiling region of the interlock and/or on a side wall of the interlock and/or in the inner region of the interlock, in particular centrally in the inner region of the interlock. The separation sensor is preferably arranged in such manner that the number of people in the inner region of the interlock during the scanning by the body scanner can be verified by means of the separation sensor.

According to a preferred embodiment of the present disclosure, the separation sensor is formed as an infrared sensor and/or an optical sensor, in particular by means of a camera.

According to one embodiment of the present disclosure, it is provided that the interlock has an entrance door device at the entrance of the interlock, wherein the entrance can be closed and opened by means of the entrance door device, wherein the interlock has an exit door device at the exit of the interlock, wherein the exit can be closed and opened by means of the exit door device. It is in particular conceivable that the entrance door device comprises a sliding door, in particular an automatic sliding door and/or a swing door, in particular an automatic swing door. It is in particular conceivable that the exit door device comprises a sliding door, in particular an automatic sliding door and/or a swing door, in particular an automatic swing door.

Alternatively, it is conceivable that the interlock comprises a pivotable and/or rotatable door device, wherein the door device is pivotable and/or rotatable at least between a first position and a second position,
  wherein, in the first position, the exit is closed by means of the door device and the entrance is opened,
  wherein, in the second position, the entrance is closed by means of the door device and the exit is opened. According to a preferred configuration, it is conceivable that an intermediate position is present, in which the entrance and the exit are closed by means of the pivotable and/or rotatable door device. It is preferably conceivable that the door device is in this intermediate position during the scanning by means of the body scanner and during the measurement by means of the separation sensor such that both the entrance and the exit are closed. The interlock can therefore advantageously have a rotatable door device with at least one opening which, depending on its rotational position, seals:
  the entrance, or
  the exit, or
  both the entrance and the exit.
It is optionally conceivable that the door device has a rotational position in which both the entrance and the exit are opened.

Alternatively or additionally, according to one embodiment of the present disclosure, it is conceivable that the entrance door device and/or the exit door device and/or the pivotable and/or rotatable door device comprises one or a plurality of the following devices:
  a hinged door,
  a revolving door,
  a security revolving door,
  a bifold door,
  a tripod turnstile,
  a turnstile,
  a pivot door.

The interlock can in particular have a playback device. In particular, it can signal in a visual and/or acoustic manner to the person within the interlock what is in particular additionally necessary for successful passage and/or which actions are to be performed by the person in order to ensure successful passage. The signal can thereby relate to the number of people and/or to any hazardous objects present, in particular to their position.

It is conceivable that the playback device is arranged in such manner that a warning notification, in particular a warning notification relating to a determination of a hazardous object by means of the body scanner, cannot be perceived from the inner region of the interlock. This may for example be advantageous in order to give the security personnel a time and/or information advantage over a person in the interlock who is carrying a hazardous object.

A further subject matter of the present disclosure is a system, comprising at least one interlock according to one embodiment of the present disclosure, wherein the system also has a preliminary region arranged in front of the entrance of the interlock, wherein the preliminary region can be entered through an entry device,
  wherein arranged at the entry device or in the environment of the entry device is
    a sensor device and/or
    an identity checking device and/or
    a ticket checking device,
  by means of which people entering the preliminary region can be checked.

In this manner, a system is provided, which enables a controlled and secure entrance with little personnel effort and high security.

People entering the preliminary region can preferably be counted by means of the entry device,
  wherein the system is configured in such manner that:
    a count of the people entering the preliminary region is carried out by means of the sensor device and/or the identity checking device and/or the ticket checking device,
    a further count of the people exiting the preliminary region through the interlock is carried out by means of the interlock, in particular by means of the separation sensor of the interlock,
    a number of people within the preliminary region is determined and/or monitored by means of the count and the further count.

The sensor device at the entry device or in the environment of the entry device is for example formed by means of an infrared sensor and/or an optical sensor, for example a camera. The sensor device can in particular be formed as a further separation sensor.

According to a preferred embodiment of the present disclosure, it is conceivable that an identity check by means of the identity checking device and/or a ticket check by means of the ticket checking device is carried out at the entry device of the preliminary region and/or in the environment of the entry device of the preliminary region for people who reach the preliminary region through the entry device. It is conceivable that the entry device, in particular exclusively, opens when an identity check carried out by means of the identity checking device and/or a ticket check carried out by means of the ticket checking device is successful such that a person can reach the preliminary region only in the case of a successful identity check and/or successful ticket check. The identity checking device is for example formed to detect and/or check a passport document. The ticket checking device is for example formed to detect and/or check a plane ticket and/or train ticket. It is alternatively or additionally conceivable that the identity checking device has one or a plurality of biometric sensors, for example for facial recognition or fingerprint recognition. It is conceivable that each successful identity check and/or successful ticket check is counted such that a count of the people entering the preliminary region is carried out by means of the identity check and/or the ticket check. It is conceivable that this count carried out by means of the identity check and/or the ticket check is compared with the further count, wherein the further count is carried out by means of the interlock, in particular by means of the separation sensor of the interlock, and wherein the further count relates at least to the people exiting the preliminary region through the interlock. Therefore, the number of people within the preliminary region is determined and/or monitored by the count by means of the identity check and/or the ticket check as well as by the further count by means of the interlock. It can be further determined whether the number of people entering the preliminary region through the entry device in total matches the number of people exiting the preliminary region via the interlock. In this way, a particularly high level of security can be achieved. It is thereby particularly advantageously possible to implement a permanent comparison between the number of people exiting and entering.

According to a preferred embodiment of the present disclosure, the preliminary region has a barrier and/or wall and can be entered during normal operation, preferably exclusively through the entry device and/or further entry devices. The interlock, which can also establish a connection between the preliminary region and an environment, is preferably set and/or is operated in such manner that entry from the environment into the preliminary region through the interlock is prevented during normal operation. Therefore, the preliminary region preferably cannot be entered during the normal operation of the interlock via the interlock.

According to a preferred embodiment of the present disclosure, it is conceivable that a baggage conveyor means, in particular a baggage carousel, is arranged in the preliminary region or adjoining the preliminary region. It is conceivable that a person with their baggage reaches the preliminary region through the entry device and leaves their baggage on the baggage conveyor means. Then, the person moves into the interlock without their left baggage. After successfully passing through the interlock, the person can collect their baggage again. The baggage is preferably checked and/or screened as it is conveyed by means of the baggage conveyor means, in particular by means of an additional sensor device configured to identify hazardous objects and/or hazardous substances in the baggage.

According to one embodiment of the present disclosure, it is conceivable that the system has a playback device, wherein the system is configured in such manner that a warning notification can be emitted by means of the playback device as a function of the measurement of the number of people by means of the separation sensor and/or as a function of the scan of the body by means of the body scanner. The warning notification preferably signals that a hazardous object has been detected and/or includes additional information about the detected hazardous object, for example, what kind of hazard object it is and/or the location at which the hazardous object is being carried by the person in the interlock. Additionally or alternatively, the warning notification signals that more than one person is located in the interlock. The playback device preferably comprises a visual playback device, in particular a screen. Alternatively or additionally, it is conceivable that the playback device comprises an acoustic playback device, in particular a speaker. The playback device is preferably arranged in such manner that the warning notification can be perceived by one or a plurality of security personnel. Additionally or alternatively, it is conceivable that the playback device is arranged in such manner that a warning notification can be perceived from the inner region of the interlock. For example, it is possible that people in the interlock are signaled by means of the playback device that there are too many people in the inner region of the interlock when the separation sensor detects that more than one person is located in the inner region of the interlock. It is for example conceivable that the playback device is partially or completely formed as part of the interlock. It is conceivable that the playback device is arranged in such manner that a warning notification, in particular a warning notification relating to a determination of a hazardous object by means of the body scanner, cannot be perceived from the inner region of the interlock. This may for example be advantageous in order to give the security personnel a time and/or information advantage over a person in the interlock who is carrying a hazardous object.

A further subject matter of the present disclosure is a method for controlling a flow of people and/or for security checking by means of an interlock according to one embodiment of the present disclosure or by means of a system according to one embodiment of the present disclosure, wherein the method comprises the following steps:
the number of people in the inner region of the interlock is measured by means of the separation sensor,
a body of a person in the inner region of the interlock is scanned by means of the body scanner.

The two steps can in particular be carried out directly one after another or at least partially simultaneously.

In this way, a time-efficient and reliable security check and/or control of a flow of people can take place. It is in particular possible that the assignment of security personnel, who are specifically provided to guide people individually to a body scanner, can be dispensed with.

The method according to the disclosure is in particular a computer-implemented method, in which one, a plurality of or all steps of the method are carried out by computer. In particular, the individual components of the interlock and/or of the system are actuated by computer.

According to a preferred embodiment of the present disclosure, it is possible that, prior to the measurement of the number of people by means of the separation sensor and prior to the scanning of the body by means of the body scanner:
at least one person moves through the opened entrance into the interlock, preferably while the exit of the interlock is closed,
optionally the entrance of the interlock is closed after the at least one person has moved through the opened entrance into the interlock.

According to a preferred embodiment of the present disclosure, it is possible that the exit of the interlock is opened as a function of the measurement of the number of people by means of the separation sensor and/or as a function of the scan of the body by means of the body scanner. The exit of the interlock is preferably sealed during the measurement by means of the separation sensor and during the scan by means of the body scanner by an exit door device or a pivotable and/or rotatable door device. The exit of the interlock is preferably opened by means of the exit door device or the pivotable and/or rotatable door device as a function of the measurement of the number of people by means of the separation sensor and as a function of the scan of the body by means of the body scanner. Therefore, the flow of people can be particularly advantageously controlled without security personnel having to be constantly present in the region of the body scanner for this purpose in order to control the flow of people to the body scanner and from the body scanner.

According to a preferred embodiment of the present disclosure, it is possible
- that the measurement of the number of people by means of the separation sensor and the scanning of the body by means of the body scanner are carried out preferably at least partially simultaneously while the exit of the interlock is closed,
- wherein the exit of the interlock is opened exclusively when:
- the measurement of the number of people by means of the separation sensor indicates that exactly one person is located in the inner region of the interlock, and additionally
- the scanning of the body by means of the body scanner indicates that the person in the inner region of the interlock is not carrying any hazardous objects.

According to one embodiment of the present disclosure, it is particularly advantageously possible that the entrance of the interlock is opened only when and/or after a person scanned by means of the body scanner exits the interlock such that the next person can enter the interlock. In this way, an advantageous level of security can be achieved.

According to a preferred embodiment of the present disclosure, it is possible that
- in the case that the measurement of the number of people by means of the separation sensor indicates that more than one person is located in the inner region of the interlock, and/or
- in the case that the scanning of the body by means of the body scanner indicates that one person in the interlock is carrying at least one hazardous object, the exit remains closed and optionally a warning notification is emitted by means of a playback device.

A further subject matter of the present disclosure is a computer program product, wherein the computer program product comprises commands, which, when the computer program product is run by a computer, cause the computer to carry out a method according to one embodiment of the present disclosure. The computer is preferably partially or completely formed as part of the interlock and/or formed partially or completely externally to the interlock. The computer is preferably formed to actuate the separation sensor and the body sensor as well as the entrance door device, the exit door device and/or the pivotable and/or rotatable door device. It is conceivable that the computer is a single computer device or that the computer comprises a distributed computer device. The plurality of computer devices can in particular be arranged at different locations, for example partially as part of the interlock and partially as part of a monitoring device for the security personnel.

A further subject matter of the present disclosure is a computer-readable storage medium, comprising a computer program product according to one embodiment of the present disclosure.

The features, embodiments and advantages, which have already been described in connection with the interlock according to the disclosure or in connection with an embodiment of the interlock according to the disclosure, can thereby also be applied to the system according to the disclosure, the method according to the disclosure, the computer program product according to the disclosure and the computer-readable storage medium according to the disclosure. The features, embodiments and advantages, which have already been described in connection with the system according to the disclosure or in connection with an embodiment of the system according to the disclosure, can thereby also be applied to the interlock according to the disclosure, the method according to the disclosure, the computer program product according to the disclosure and the computer-readable storage medium according to the disclosure. The features, embodiments and advantages, which have already been described in connection with the method according to the disclosure or in connection with an embodiment of the method according to the disclosure, can thereby also be applied to the interlock according to the disclosure, the system according to the disclosure, the computer program product according to the disclosure and the computer-readable storage medium according to the disclosure.

BRIEF DESCRIPTION OF THE DRAWING

Further advantages and details of the disclosure will be explained below on the basis of the exemplary embodiment represented in the drawing. It shows:

FIG. 1 a schematic representation of a system according to one exemplary embodiment of the present disclosure.

DETAILED DESCRIPTION OF THE DRAWING

The system according to FIG. 1 thereby comprises an interlock 1, by means of which a flow of people can be controlled and a security check carried out. A preliminary region 30 is arranged in front of the interlock 1. A person can reach the inner region 4 of the interlock 1 from the preliminary region 30 through the entrance 2 of the interlock 1. The entrance 2 is equipped with an entrance door device 2', in particular a sliding door. The entrance 2 can be opened and closed by the entrance door device 2'. A person scanner 5 is arranged in the interlock 1, which makes it possible, preferably by means of X-rays and/or terahertz radiation, to scan the body of a person who is located in the inner region 4 of the interlock 1. Furthermore, the interlock 1 comprises a separation scanner 6, which is arranged in the represented exemplary embodiment in a ceiling region of the interlock 1 and by means of which it can be determined whether exactly one person is located in the inner region 4 of the interlock 1. Furthermore, the interlock 1 comprises an exit 3 with an exit door device 3'. Scanned people can exit the inner region 4 of the interlock 1 through the exit 3 and thus for example reach a security region of an airport, of a train station or of another building. The exit 3 of the interlock 1 can be opened and closed by means of the exit door device 3'.

Furthermore, a further interlock 1' is arranged adjoining the preliminary region 30 in the exemplary embodiment shown. The further interlock 1' can for example be formed structurally identically to the interlock 1 such that the preliminary region can also be exited through the further interlock 1'. Furthermore, an exit region 40 is present for the preliminary region 30. The exit region 40 is sealed by means of a door device 40' and can be opened, if required, for example for people for whom the interlocks 1, 1' are not suitable for physical or medical reasons. The preliminary region 30 is a region which is closed off from the environment by means of a barrier 32 and which can be entered through an entry device 20. The entry device 20 is configured in such manner that it can enable and block entry into the preliminary region 30. For example, the entry device 20 comprises one or a plurality of swing doors for this purpose. Alternatively, other types of door are also conceivable. A sensor device 23 and/or an identity checking device 22 and/or a ticket checking device 21 is arranged at the entry device 20. It is conceivable that the entry device 20 grants a person entry to the preliminary region 30 when a ticket check has been carried out by means of the ticket checking device 21 and/or an identity check has been carried out by means of the identity checking device 22. In this manner, granting of access to the preliminary region 30 can be controlled. On the one hand, this can ensure that only one person per ticket check and/or identity check passes the entry device 20. On the other hand, a count or limit of the number of people within the preliminary region 30 and/or the interlock 1, 1' and/or the exit region 40 is possible as a result. In particular, the opening of the entry device 20 could be locked at least temporarily when the number of people within the mentioned systems exceeds a certain number. Furthermore, a baggage conveyor means 31, in particular a baggage carousel, is arranged in the preliminary region 30, on which a person in the preliminary region 30 places their baggage, including any objects they are carrying, before the person can enter the interlock 1.

According to one exemplary embodiment of a method according to the disclosure, a person passes through the entry device 20 and thus reaches the preliminary region 30. The passage through the entry device 20 is counted by means of a sensor device 23 and/or the identity checking device 22 and/or the ticket checking device 21. The person leaves their baggage on the baggage conveyor means 21 in the preliminary region 30. If there is no one in the interlock 1, the interlock 1 is in a state, in which its exit 3 is closed, for example by means of the exit door device 3', and in which its entrance 2 is opened. The person passes through the entrance 2 into the inner region 4 of the interlock 1. The entrance 2 of the interlock 1 is closed, for example by means of the entrance door device 2'. It is conceivable that the entrance 2 is closed as a function of a detection of the separation sensor 6, in particular when the separation sensor 6 detects that the person has entered the inner region 4. A body scan is carried out by means of the body scanner 5 for the person located in the inner region 4. Simultaneously to the scan by the body scanner 5, it is preferably checked by means of the separation sensor 6 that exactly one person is located in the inner region 4 of the interlock 1. If the body scanner and the measurement of the separation sensor 6 indicates that exactly one person is located in the inner region 4 and the person is not carrying any hazardous objects, the exit 3 opens so that the person can exit the interlock through the exit. Otherwise, when more than one person is detected in the inner region 4 or the body scan identifies a hazardous object, the exit 3 does not open. Instead, a warning notification and/or error notification is preferably indicated, for example to security personnel and/or to the person or people in the interlock 1. If, for example, it has been detected that more than one person is located in the inner region 4 of the interlock 1, an acoustic and/or visual warning notification can be emitted, which requests the people in the inner region 4 of the interlock 1 to exit the interlock 1 through the entry 3 until only one person is located in the inner region 4. If a hazardous object has been detected by means of the body scanner 5, at least the security personnel is informed by means of the warning notification such that further checks or countermeasures can be initiated. Therefore, particularly advantageous automation can be achieved, which can save time. At the same time, the need for security personnel to be present at each body scanner, monitoring and controlling the flow of people to the body scanner and from the body scanner can be avoided.

It can be counted when a person successfully passes through the interlock 1, for example by means of the opening of the exit 3, the measurement by the body scanner 5 and/or the measurement by the separation sensor 6. This further count can be compared with count carried out by means of the sensor device 23 and/or the identity checking device 22 and/or the ticket checking device 21. In this way, it can for example be monitored whether the number of people entering the preliminary region 30 matches the number of people exiting the preliminary region 30. A particularly advantageous and automatable additional security check can be hereby configured. Furthermore, a limit of the number of people within the preliminary region 30 and/or the interlocks 1, 1' and/or the exit region 40 is possible as a result.

The invention claimed is:

1. An interlock comprising: an entrance, an exit, and an inner region arranged between the entrance and the exit,
    wherein the interlock has a body scanner and a separation sensor,
    wherein the separation sensor is configured to measure the number of people in the inner region of the interlock,
    wherein the body scanner is configured to scan a body of a person in the inner region of the interlock, and
    the exit is configured to remain closed if the number of people measured in the inner region of the interlock is more than one or the body scanner indicates that one person in the interlock is carrying at least one hazardous object and a warning notification is configured for emitting by a playback device as a function of a measurement of the number of people and/or as a function of the scan of the body.

2. The interlock according to claim 1, wherein the body scanner is configured to detect hazardous objects on the body of the person and/or on clothing of the person.

3. The interlock according to claim 1, wherein the body scanner is configured to scan the body of the person by X-ray and/or terahertz radiation.

4. The interlock according to claim 1, wherein the separation sensor and the body scanner are configured such that a measurement is carried out by the separation sensor and a scan carried out by the body scanner directly one after another or carried out by the body scanner partially simultaneously.

5. The interlock according to claim 1, wherein the separation sensor is arranged in a ceiling region of the interlock and/or on a side wall of the interlock and/or in the inner region of the interlock, centrally in the inner region of the interlock.

6. The interlock according to claim 1, wherein the interlock has an entrance door device at the entrance of the interlock, wherein the entrance is configured for closing and opening using the entrance door device, wherein the interlock has an exit door device at the exit of the interlock, wherein the exit is configured for closing and opening using the exit door device.

7. A system, comprising at least one interlock according to claim 1, wherein the system also has a preliminary region arranged in front of the entrance of the interlock, wherein the preliminary region is configured for entry through an entry device,
- wherein arranged at the entry device or in the environment of the entry device is
  - a sensor device and/or
  - an identity checking device and/or
  - a ticket checking device,
- through which people entering the preliminary region are configured for checking.

8. The system according to claim 7, wherein people entering the preliminary region are configured for counting using the entry device,
- wherein the system is configured such that:
  - a count of the people entering the preliminary region is carried out using the sensor device and/or the identity checking device and/or the ticket checking device,
  - a further count of the people exiting the preliminary region through the interlock is carried out using the separation sensor of the interlock,
  - a number of people within the preliminary region is determined and/or monitored by the count and the further count.

9. The system according to claim 7, wherein the system has a playback device, wherein the system is configured such that a warning notification is configured for emitting by the playback device as a function of the measurement of the number of people by the separation sensor and/or as a function of the scan of the body by the body scanner.

10. A method for controlling a flow of people and/or for security checking using an interlock comprising an entrance and an exit as well as an inner region arranged between the entrance and the exit, wherein the interlock has a body scanner and a separation sensor, wherein the separation sensor is configured to measure the number of people in the inner region of the interlock, wherein the body scanner is configured to scan a body of a person in the inner region of the interlock or using a system according to claim 7,
- wherein the method includes the following steps:
  - measuring the number of people in the inner region of the interlock using the separation sensor, and
  - scanning a body of a person in the inner region of the interlock using the body scanner.

11. The method according to claim 10, wherein, prior to the measurement of the number of people using the separation sensor and prior to the scanning of the body using the body scanner:
- at least one person moves through the opened entrance into the interlock, while the exit the interlock is closed,
- wherein the entrance of the interlock is closed after the at least one person has moved through the opened entrance into the interlock.

12. The method according to claim 10,
- wherein the exit of the interlock is opened as a function of the measurement of the number of people using the separation sensor and/or as a function of the scanning of the body using the body scanner.

13. The method according to claim 10,
- wherein the measurement of the number of people by the separation sensor and the scanning of the body by the body scanner are carried out partially simultaneously while the exit of the interlock is closed,
- wherein the exit of the interlock is opened exclusively when:
- the measurement of the number of people by the separation sensor indicates that exactly one person is located in the inner region of the interlock, and additionally
- the scanning of the body by the body scanner indicates that the person in the inner region of the interlock is not carrying any hazardous objects.

14. The method according to claim 10, wherein
- in the case that the measurement of the number of people by the separation sensor indicates that more than one person is located in the inner region of the interlock, and/or
- in the case that the scanning of the body by the body scanner indicates that one person in the interlock is carrying at least one hazardous object, the exit remains closed, wherein a warning notification is emitted by a playback device.

15. A computer program product, wherein the computer program product comprises commands, which, when the computer program product is run by a computer, cause the computer to carry out a method according to claim 10.

* * * * *